United States Patent
Broberg, III et al.

(10) Patent No.: US 6,289,430 B1
(45) Date of Patent: *Sep. 11, 2001

(54) METHOD AND APPARATUS FOR TARGET ADDRESSING AND TRANSLATION IN A NON-UNIFORM MEMORY ENVIRONMENT WITH USER DEFINED TARGET TAGS

(75) Inventors: Robert Neal Carlton Broberg, III, Rochester; Jonathan William Byrn, Kasson; Chad B. McBride; Gary Paul McClannahan, both of Rochester, all of MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,029

(22) Filed: Feb. 18, 1999

(51) Int. Cl.$^7$ .................................................. G06F 12/10

(52) U.S. Cl. ............................................. 711/203; 711/206

(58) Field of Search ................................... 711/206, 207, 711/202, 203

(56) References Cited

U.S. PATENT DOCUMENTS

| | | | | |
|---|---|---|---|---|
| 5,751,990 | * | 5/1998 | Krolak et al. | 711/207 |
| 5,809,562 | * | 9/1998 | Gaskins et al. | 711/207 |
| 5,835,928 | * | 11/1998 | Auslander et al. | 711/3 |
| 5,930,832 | * | 7/1999 | Heaslip et al. | 711/207 |
| 5,991,848 | * | 11/1999 | Koh | 711/3 |
| 6,026,467 | * | 2/2000 | Petty | 711/108 |
| 6,047,365 | * | 4/2000 | Chambers et al. | 711/220 |
| 6,092,172 | * | 7/2000 | Nishimoto et al. | 711/207 |

\* cited by examiner

*Primary Examiner*—Matthew Kim
*Assistant Examiner*—Christian P. Chace
(74) *Attorney, Agent, or Firm*—Joan Pennington

(57) ABSTRACT

A method and apparatus are provided for target addressing and translation in a non-uniform memory environment with user defined target tags. The apparatus for target addressing and translation includes a processor and a first address translation unit coupled to the processor. The first address translation unit translates an effective address (EA) to a real address (RA). The first address translation unit includes a target tag associated with each address translation. A second address translation unit translates a real address (RA) to a target address (TA). The second address translation unit includes a target tag associated with each address translation. A cache includes a cache directory and a target tag is stored into the cache directory with each cache fill.

20 Claims, 8 Drawing Sheets

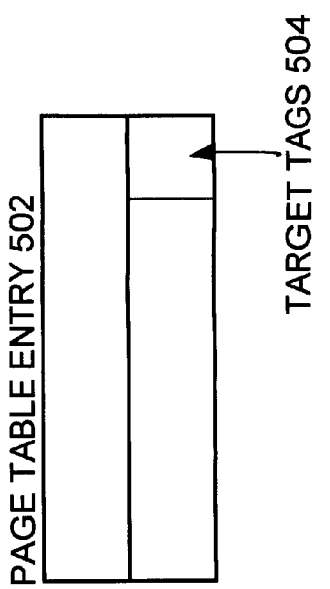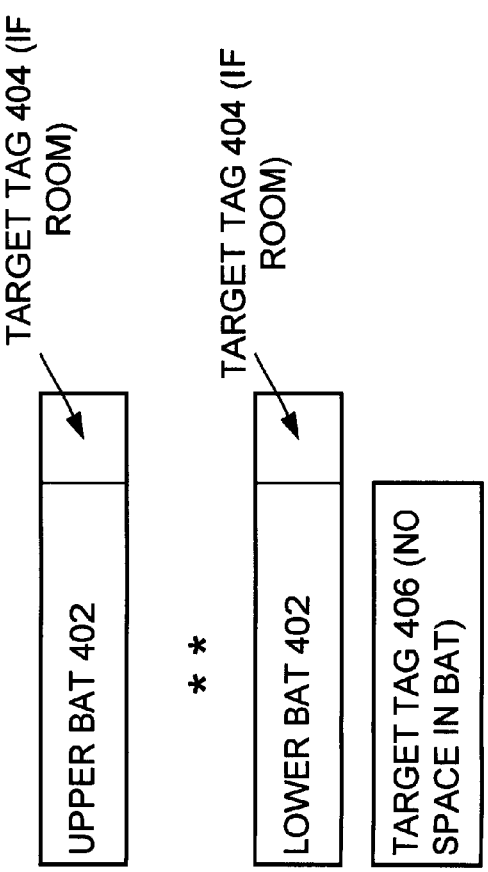

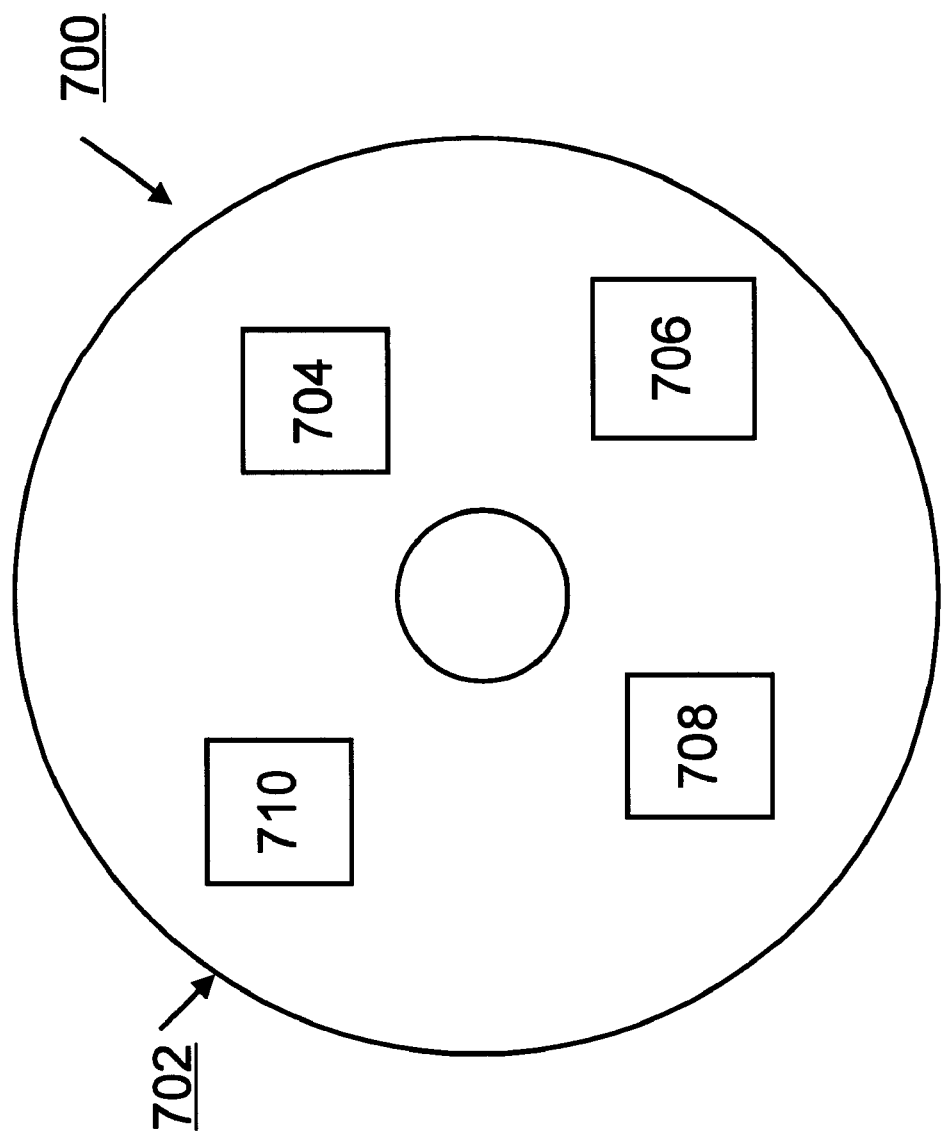

US 6,289,430 B1

METHOD AND APPARATUS FOR TARGET ADDRESSING AND TRANSLATION IN A NON-UNIFORM MEMORY ENVIRONMENT WITH USER DEFINED TARGET TAGS

FIELD OF THE INVENTION

The present invention relates generally to the data processing field, and more particularly, relates to a method and apparatus for target addressing and translation in a non-uniform memory environment with user defined target tags.

DESCRIPTION OF THE RELATED ART

Integration of a microprocessor core onto a chip, such as a communications adapter chip, brings with it a number of challenges. The number and types of addressable memory spaces/devices or Targets directly accessible by the processor can significantly increase.

Also the Targets may have different access characteristics, such as different speeds, organization, side effects, overlapping and/or non-contiguous address ranges and the like.

A need exists for an effective mechanism for target addressing and translation in a non-uniform memory environment.

SUMMARY OF THE INVENTION

A principal object of the present invention is to provide an improved method and apparatus for target addressing and translation in a non-uniform memory environment with user defined target tags. Other important objects of the present invention are to provide such method and apparatus for target addressing and translation for data communications and to provide such method and apparatus that overcome some disadvantages of prior art arrangements.

In brief, a method and apparatus are provided for target addressing and translation in a non-uniform memory environment with user defined target tags. The apparatus for target addressing and translation includes a processor and a first address translation unit coupled to the processor. The first address translation unit translates an effective address (EA) to a real address (RA). The first address translation unit includes a target tag associated with each address translation.

In accordance with features of the invention, a second address translation unit translates a real address (RA) to a target address (TA). The second address translation unit includes a target tag associated with each address translation. A cache includes a cache directory and a target tag is stored into the cache directory with each cache fill.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3, 4, and 5 respectively illustrate examples for translation facility types including a flat real mode, a block address translation and a demand page virtual of the preferred embodiment;

FIG. 7 is a block diagram illustrating a computer program product in accordance with the invention.

DETAILED DESCRIPTION OF THE PREFERRED EMBODIMENTS

Figure 1A:
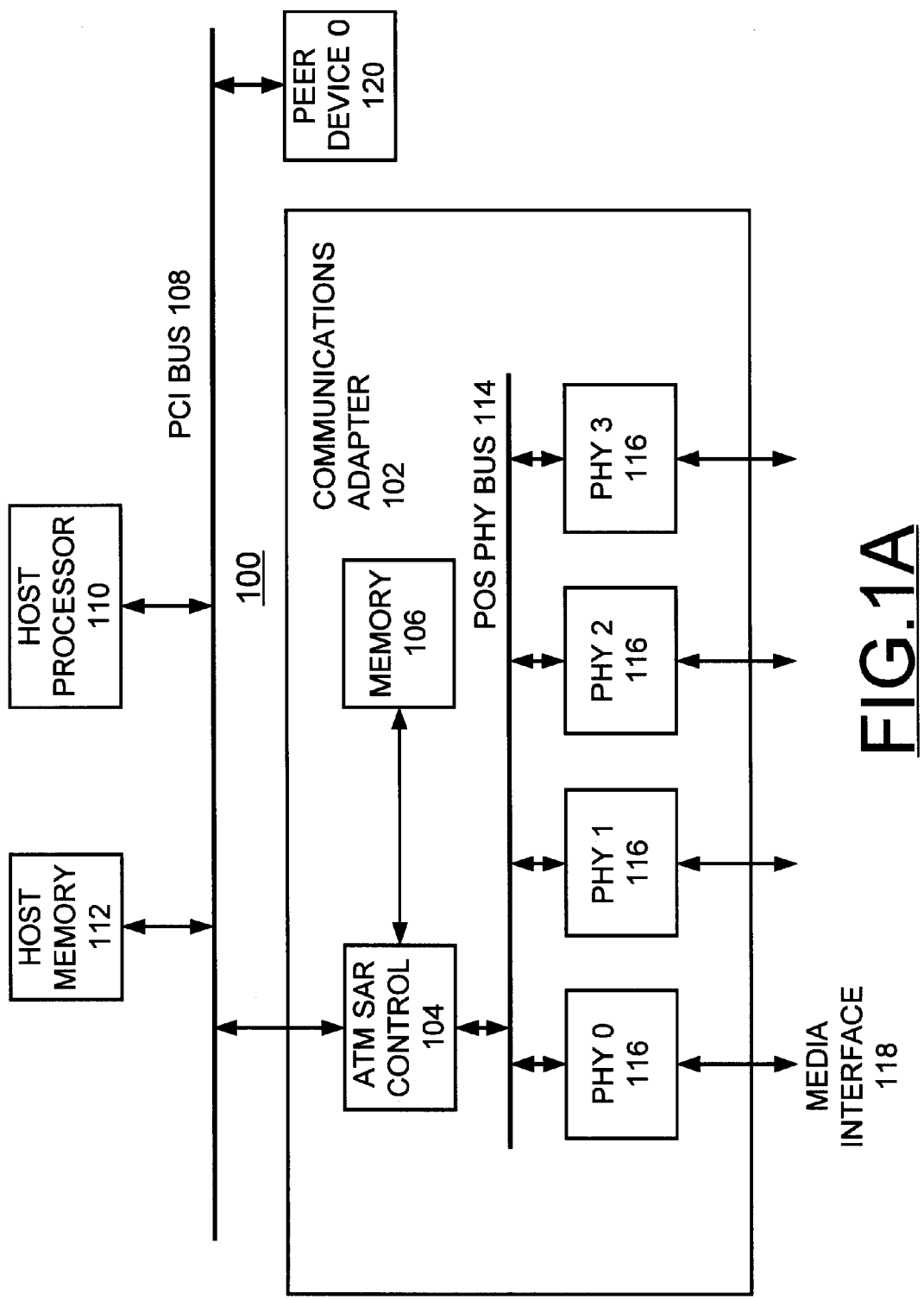
FIG. 1A is a block diagram representation illustrating a communications adapter of the preferred embodiment.

Having reference now to the drawings in FIG. 1A, there is shown a communications system generally designated by 100 including a communications adapter generally designated by 102 and arranged in accordance with the preferred embodiment. As shown in FIG. 1A, adapter 102 includes an ATM segmentation and reassembly control 104 coupled to a local memory 106. As shown, the ATM SAR control 104 is connected to a peripheral component interconnect (PCI) bus 108 coupled to a host processor 110 and a host memory 112. The ATM SAR control 104 is connected by a packet over SONET (POS) physical bus 114 to a plurality of physical (PHY) layer 116. Each of the multiple physical layers 116 is connected to a respective media interface 118. Multiple peer devices 120 (one shown) are connected to the PCI bus 108. Adapter 102 provides interface and translator functions between the PHY layers 116 and the peripheral component interconnect (PCI) bus 108. Adapter 102 is illustrated in simplified form sufficient for an understanding of the present invention.

Figure 1B:
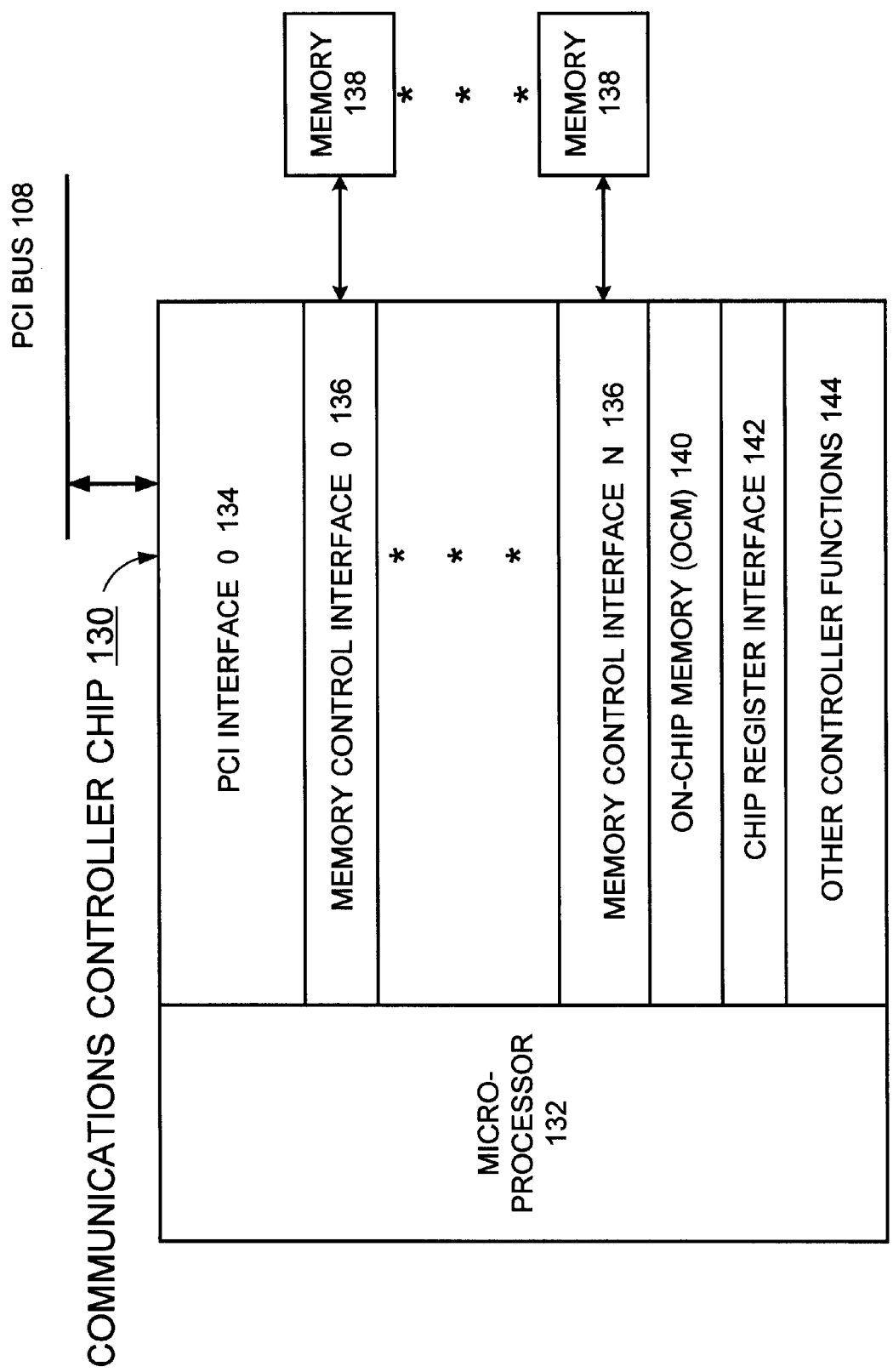
FIG. 1B is a block diagram representation illustrating a communications controller chip of the preferred embodiment.

Having reference now to FIG. 1B, there is shown a communications controller chip generally designated by 130 including an embedded microprocessor 132 and arranged in accordance with the preferred embodiment. As shown in FIG. 1B, communications controller chip 130 also includes a PCI interface 134 connected to the peripheral component interconnect (PCI) bus 108. Communications controller chip 130 includes a plurality of memory control interfaces (0–N) 136 each connected to a respective memory 138. Communications controller chip 130 includes an on-chip memory (OCM) 140, a chip register interface 142 and other controller components 144. It should be understood that the present invention is not limited to the illustrated communication adapter 102 and communications controller chip 130. It should be understood that the principles of the present invention are applicable to various other embedded applications or various systems on a chip type of applications.

In accordance with features of the invention, by integrating target tagging into the Memory Management Units of the processor, the Processor Caches when present, and the external target interface units, advantages are gained. Target tagging reduces the amount of downstream logic by eliminating at least one array of comparitors that would otherwise be needed for the translation. In addition, this integrated target tagging of the preferred embodiment reduces the time, such as by at least one cycle, of translation to the target address space. Most importantly this integrated target tagging of the preferred embodiment provides additional architectural opportunities not available with the other target translation method.

Figure 2:
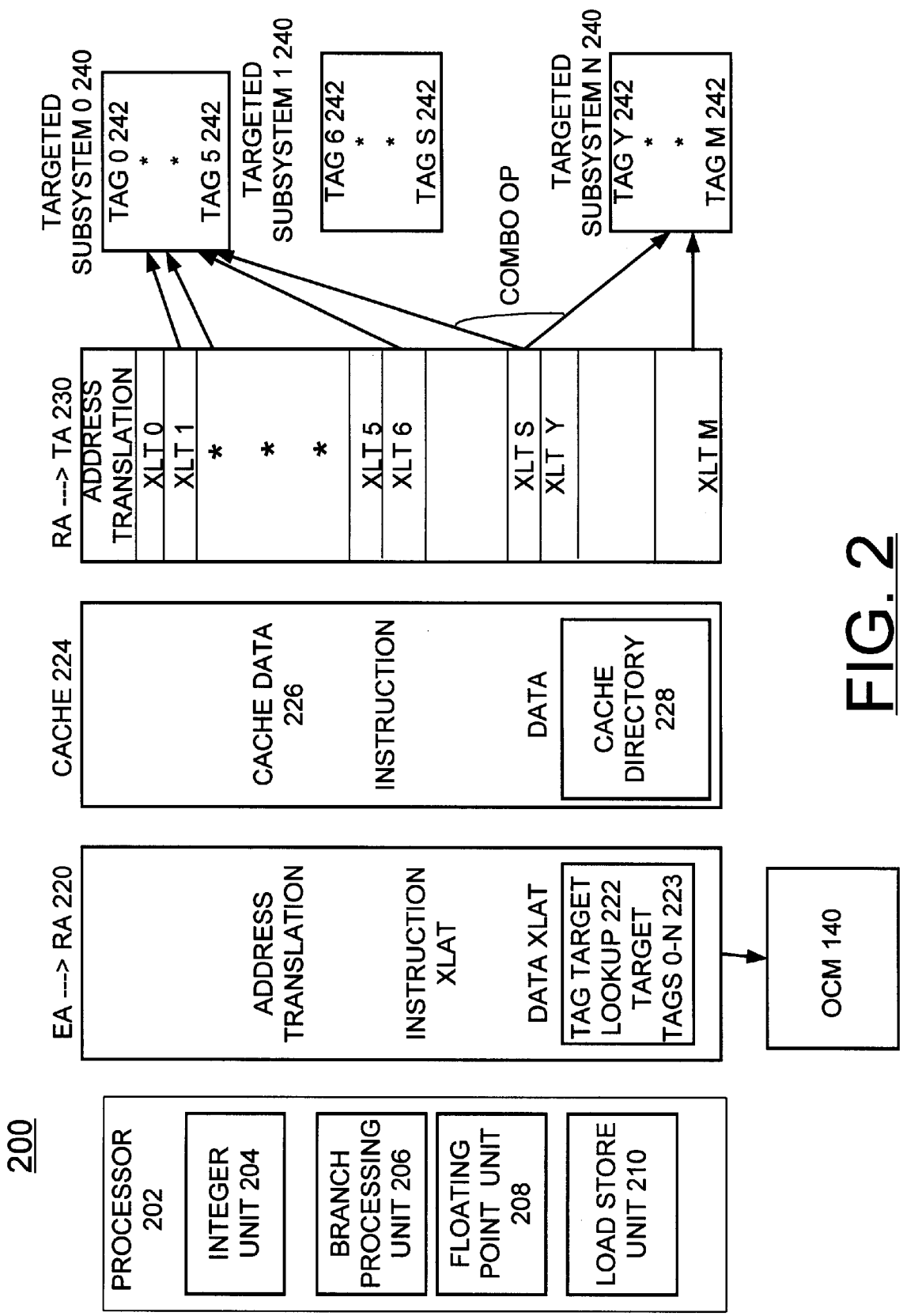
FIG. 2 is a block diagram representation illustrating apparatus for target addressing and translation in a non-uniform memory environment with user defined target tags of the preferred embodiment.

Having reference now to the drawings, in FIG. 2 there is shown apparatus of the preferred embodiment generally designated by 200 for target addressing and translation in a non-uniform memory environment with user defined target tags, for example, included within the communications adapter 102 or communications controller chip 130, and arranged in accordance with the preferred embodiment. Apparatus 200 includes an embedded processor 202 including a plurality of functional units including an integer unit 204, a branch processing unit 206, a floating point unit 208 and a load store unit 210. An effective address (EA) to real address (RA) translation unit 220 associated with the processor 202 provides address translation (XLAT) including instruction XLAT and data XLAT. EA-to-RA translation unit 220 includes a tag target lookup table 222 including a plurality of tags (0–N) 223. It should be understood that EA-to-RA translation unit 220 can be either split or unified, for example, in terms of instruction and data translation. Apparatus 200 optionally includes a split or unified cache 224 or multiple caches, each cache including a cache data memory 226 for storing, for example, instruction and data and a cache directory 228. The cache directory 228, illustrated and described with respect to FIG. 6 is stored in each cache 224. A real address (RA) to target address (TA) translation unit 230 provides real address to target address translation for multiple targeted subsystems 0–N 240 utilizing a plurality of target tags 242, for example, for each subsystem. As indicated at a pair of lines labeled COMBO OP, a combo operation targets two subsystems with one real address translation.

Dataflow through a cache 224 is not required, in apparatus 200. For example, the EA-to-RA translation unit 220 can optionally decode a tag and route the operation to a specific target, such as, the OCM 140.

Targeting tagging is the process of associating a target via a target field to each memory translation facility 220, 230. These tags are then used to provide additional functionality in a way that can be relatively transparent to the processor 202. In the preferred embodiment, target tags 240 are used to provide fast, flexible and extensible target address translation. An N-bit, such as a 4 bit target field, is used for target tags 240.

Figure 3:
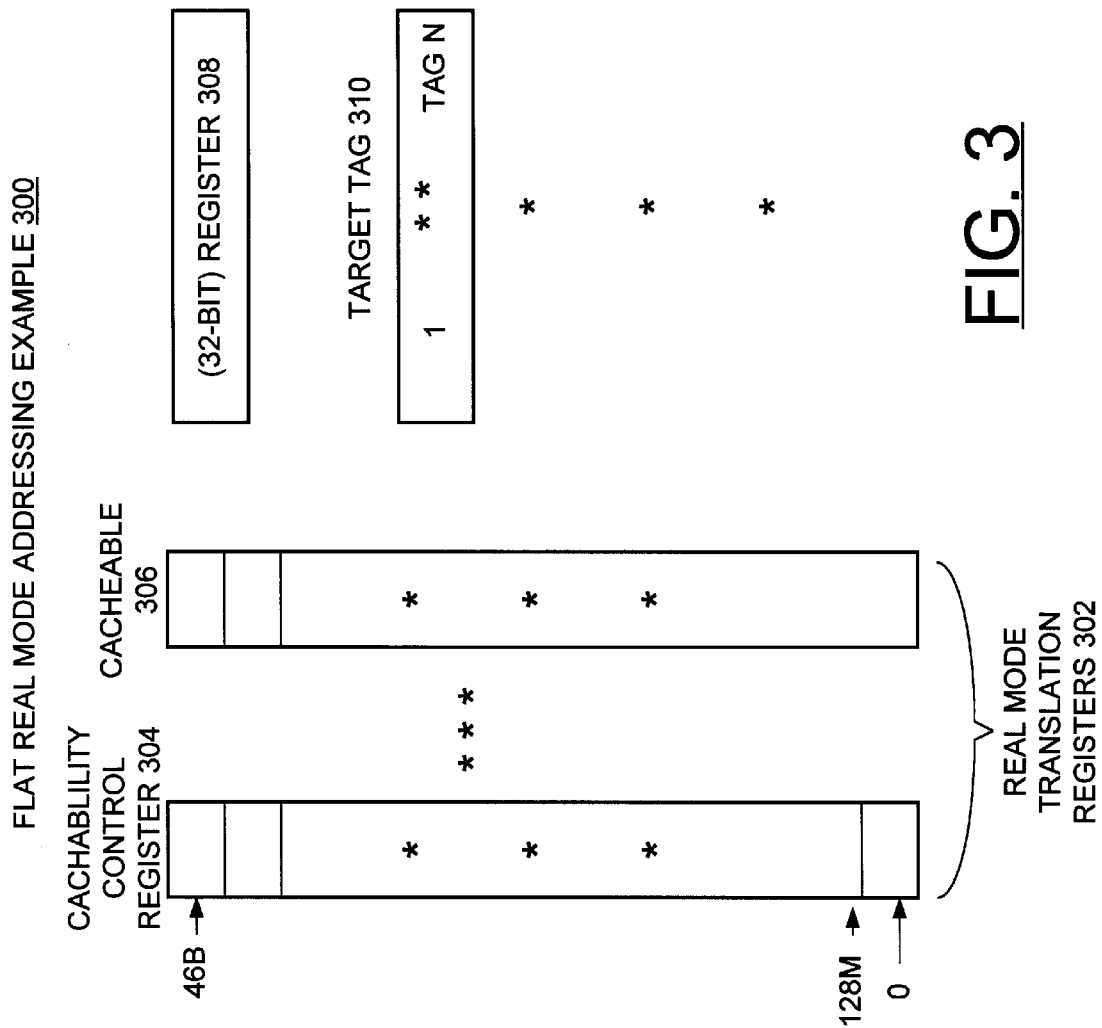

FIGS. 3, 4, and 5 illustrate three primary address translation facilities for the processor target addressing and translation apparatus 200. In accordance with features of the invention, a tag 308 (FIG. 3), 404 or 406 (FIG. 4), 504 (FIG. 5) is forwarded with each translation facility. A tag is associated with all translations that occur. When embedded processor 202 makes a request via the instruction side or the data side, a target tag is used to select which translation facility to use and which target to forward the request. Without the target tags each port of the processor would need an array of comparators to determine which target and what the translation and and what the translation and access parameters to be used were.

FIG. 3 illustrates a flat Real Mode addressing mode example 300 where EA=RA. FIG. 4 illustrates a Block address translation (BAT) Mode example 400 where the EA is translated within one defined EA region to another RA defined region, this is a linear translation. FIG. 5 illustrates a Demand Paged Virtual Mode example 500 where EA is translated to RA via a page table entry 502.

In FIG. 3, with the Real Mode addressing 300, a 4 GB address space is divided, for example, into 32 128 MB addressing regions or guarded and cacheable regions 304 and 306. One register 308, for example, includes 32 bits, where each bit controls a respective 128 MB region 304, 306. Each of the regions 304 and 306 has an associated four bit target tag (1–N) 310 defined for it. The target tags 310, for example, are contained in 4 32 bit registers.

In FIG. 4, for the block mode translation 400, a target tag 404 is contained in the block address translation (BAT) register 402 or a target tag 406 is separately stored when there is not space in the upper or lower BAT register 402. Each BAT register 402 is associated with a target. The target tag 404, 406 propagates on BAT translation.

In FIG. 5, for the Demand Page Virtual example 500, a target tag 504 is stored in each page table entry 502.

Figure 6A:
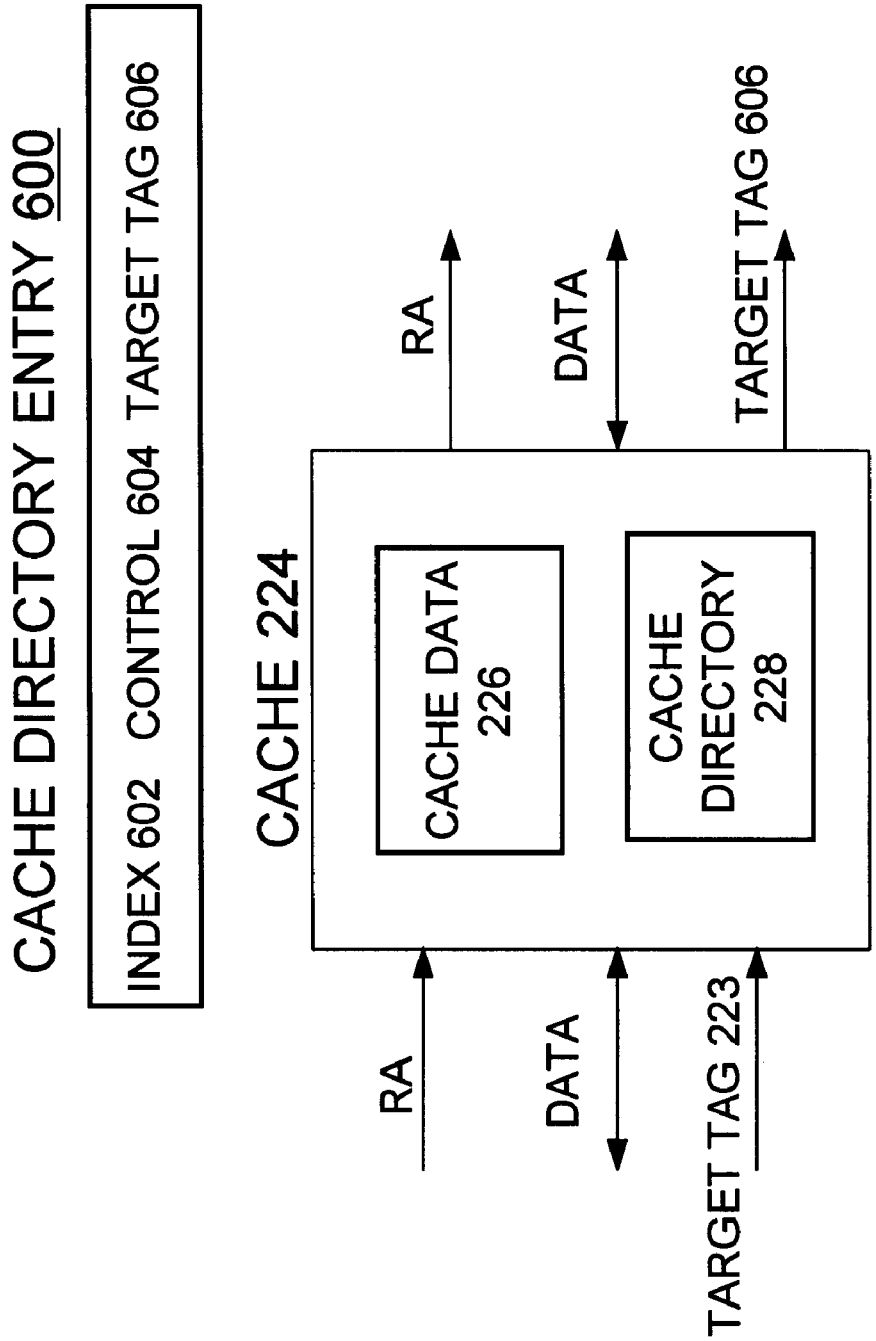
FIG. 6A illustrates a cache directory entry and cache example of the preferred embodiment.

FIG. 6A illustrates a cache directory entry 600 including an index 602, a control 604 and a target tag 606 of the cache directory 228. Target tag 223, RA and data is directly received from EA-to-RA translation unit 220 by cache 224. The target tag 606 is stored on cache fill into the cache directory 228. The target tag 606 is provided to the storage management unit to steer the cache request on flush, fill, and castout conditions. The target tag 606 is used to determine which target address translation facilities are used to start the target access.

Figure 6B:
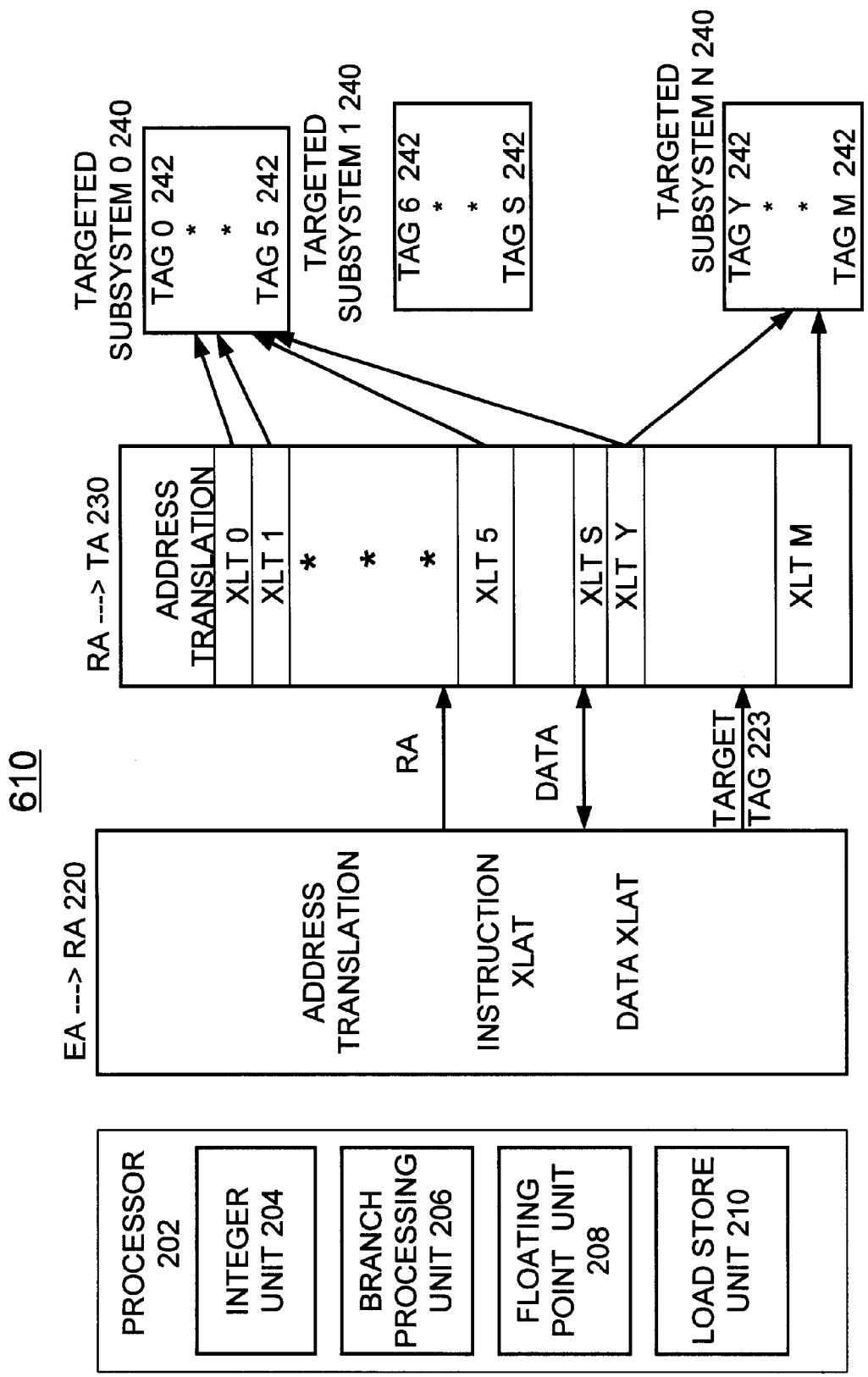
FIG. 6B illustrates a translation facility type with no cache or not cacheable, and with no on-chip memory (OCM), for direct target translation and unit interfaces.

FIG. 6B illustrates a translation facility type generally designated by 610 with no cache or not cacheable, and with no on-chip memory (OCM), for direct target translation and unit interfaces. Target tag 223, RA and data is directly received from EA-to-RA translation unit 220 by the RA-to-TA translation unit 230. RA-to-TA translation unit 230 provides the second translation including target tag 242 associated with each address translation.

It should be understood that principles of the present invention are not restricted to the specific, illustrated implementations. The following TABLE 1 provides an example list of target tags describing the following target subsystem:

TABLE 1

| | Tag | Target subsystem |
|---|---|---|
| 1. | B'0000' | OCM (On chip Memory) |
| 2. | B'0001' | Memory Subsystem 1 View 0 |
| 3. | B'0010' | Memory Subsystem 1 View 1 |
| 4. | B'0011' | Memory Subsystem 1 View 2 |
| 5. | B'0100' | Chip (non $\mu p$) Registers View 0 |
| 6. | B'0101' | Memory Subsystem 2 View 0 |
| 7. | B'0110' | Memory Subsystem 2 View 1 |
| 8. | B'0111' | Memory Subsystem 2 View 2 |
| 9. | B'1000' | PCI Master Memory View 0 |
| 10. | B'1001' | PCI Master Memory View 1 |
| 11. | B'1010' | PCI Master Memory View 2 |
| 12. | B'1011' | PCI Master Memory View 3 |
| 13. | B'1100' | combination Memory Subsystems 1 & 2 view 0 |
| 14. | B'1101' | combination Memory Subsystems 1 & 2 view 1 |
| 15. | B'1110' | combination Memory Subsystems 1 & 2 view 2 |
| 16. | B'1111' | combination Memory Subsystems 1 & 2 view 3 |

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the target addressing and translation methods of the preferred embodiment.

A sequence of program instructions or a logical assembly of one or more interrelated modules defined by the recorded program means 704, 706, 708, 710, direct adapter 102 for carrying out the target addressing and translation functions of the preferred embodiment.

While the present invention has been described with reference to the details of the embodiments of the invention shown in the drawing, these details are not intended to limit the scope of the invention as claimed in the appended claims.

What is claimed is:

1. Apparatus for target addressing and translation for use with multiple memory devices in a non-uniform memory environment, said apparatus comprising:

a processor;

a first address translation unit coupled to said processor, said first address translation unit translating an effective address (EA) to a real address (RA); and said first address translation unit including an integrated user defined target tag associated with each address translation; said integrated user defined target tag corresponding to a specific target subsystem in the non-uniform memory environment and being used to identify a target address translation facility for a target access.

2. Apparatus for target addressing and translation for use with multiple memory devices as recited in claim 1 includes a cache, said cache including a cache directory.

3. Apparatus for target addressing and translation for use with multiple memory devices as recited in claim 2 wherein said integrated user defined target tag is stored into said cache directory on each cache fill.

4. Apparatus for target addressing and translation for use with multiple memory devices as recited in claim 2 wherein said integrated user defined target tag is stored with each cache directory entry.

5. Apparatus for target addressing and translation for use with multiple memory devices as recited in claim 1 wherein said integrated user defined target tag includes a predefined target field for each memory device.

6. Apparatus for target addressing and translation for use with multiple memory devices as recited in claim 5, wherein said predefined target field for each memory device is a multiple bit target field.

7. Apparatus for target addressing and translation for use with multiple memory devices as recited in claim 1 further includes a second address translation unit, said second address translation unit translating a real address to a target address; and said second address translation unit including a user defined target tag associated with each address translation.

8. Apparatus for target addressing and translation for use with multiple memory devices as recited in claim 1 wherein said first address translation unit includes a tag target lookup.

9. Apparatus for target addressing and translation for use with multiple memory devices as recited in claim 1 wherein said first address translation unit includes a real addressing translation mode, where said effective address equals said real address and one said integrated user defined target tag is associated with each region.

10. Apparatus for target addressing and translation for use with multiple memory devices as recited in claim 1 wherein said first address translation unit includes a block addressing translation mode, where said effective address is translated within one defined EA region to another RA defined region, each said block addressing translation is associated with one said integrated user defined target tag.

11. Apparatus for target addressing and translation for use with multiple memory devices as recited in claim 1 wherein said first address translation unit includes a demand page virtual mode where said effective address is translated to said real address utilizing a page table entry, said integrated user defined target tag stored in each said page table entry.

12. A method for target addressing and translation for multiple memory devices in a non-uniform memory environment including a processor and at least one address translation unit associated with the processor, said method comprising the steps of:

storing an associated integrated user defined target tag for each target including each memory device in the non-uniform memory environment;

utilizing at least one address translation unit associated with the processor and performing an address translation; and providing one said integrated user defined target tag with each address translation; said integrated user defined target tag being used to identify a target address translation facility for a target access.

13. The method for target addressing and translation as recited in claim 12 wherein the step of performing said address translation includes the steps of performing a real addressing mode where an effective address equals a real address and each addressing region includes an associated one said integrated user defined target tag.

14. The method for target addressing and translation as recited in claim 12 wherein the step of performing said address translation includes the steps of performing a block address translation mode utilizing a linear translation from an effective address to a real address and said integrated user defined target tag is propagated on each block address translation.

15. The method for target addressing and translation as recited in claim 12 wherein the step of performing said address translation includes the steps of performing a demand page virtual mode utilizing a page table entry for translating an effective address to a real address and said integrated user defined target tag is stored in said page table entry.

16. A computer program product for use with an embedded processor and at least one address translation facility associated with the processor for target addressing and translation in a non-uniform memory environment comprising:

a recording medium;

means, recorded on said recording medium, for storing an associated integrated user defined target tag for each target including each memory device in the non-uniform memory environment; and means, recorded on said recording medium, for translating from an effective address to a real address and for providing one said integrated user defined target tag with each said address translation; said integrated user defined target tag being used to identify a target address translation facility for a target access.

17. The computer program product as recited in claim 16 includes means, recorded on said recording medium, for storing one said integrated user defined target tag in each cache directory entry.

18. The computer program product as recited in claim 16 includes means, recorded on said recording medium, for translating from a real address to a target address and for providing one said integrated user defined target tag with each said address translation.

19. The computer program product as recited in claim 16 wherein said means, recorded on said recording medium, for translating from said effective address to said real address includes means, recorded on said recording medium, for translating from said effective address to said real address using a page table entry and one said integrated user defined target tag store in each page table entry.

20. The computer program product as recited in claim 16 wherein said means, recorded on said recording medium, for storing said associated integrated user defined target tag for each target includes means, recorded on said recording medium, for storing a tag target lookup with each translation facility.

* * * * *